Aug. 28, 1923.
K. P. McELROY
NITROGEN FIXATION
Filed June 10, 1920
1,466,624
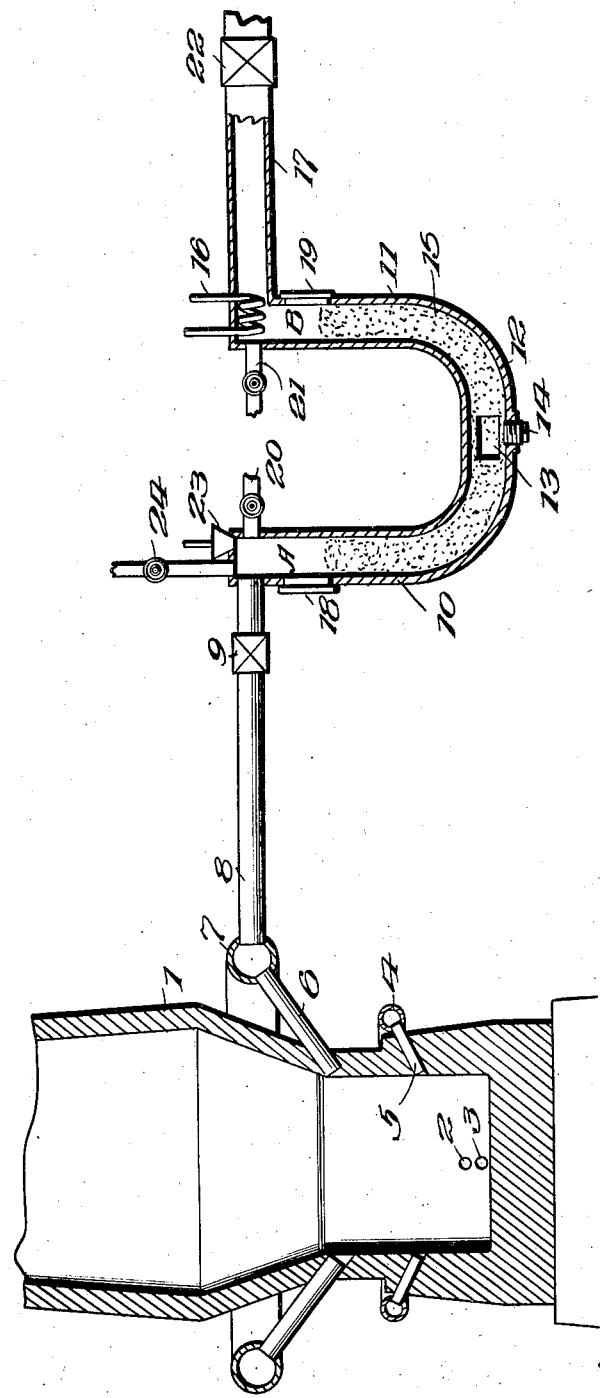
Inventor
K. P. McElroy
By
Attorney Patented Aug. 28, 1923.

1,466,624

UNITED STATES PATENT OFFICE.

KARL P. McELROY, OF WASHINGTON, DISTRICT OF COLUMBIA, ASSIGNOR TO FERRO CHEMICALS INC., OF WASHINGTON, DISTRICT OF COLUMBIA, A CORPORATION OF DELAWARE.

NITROGEN FIXATION.

Application filed June 10, 1920. Serial No. 387,817.

*To all whom it may concern:*

Be it known that I, KARL POMEROY MC-ELROY, a citizen of the United States, residing at Washington, in the District of Columbia, have invented certain new and useful Improvements in Nitrogen Fixation, of which the following is a specification.

This invention relates to nitrogen fixation; and it comprises a method of fixing nitrogen wherein cyanid vapors and fumes are produced in admixture with hot gases and such gases are transmitted through carbon to abstract the cyanid, said carbon being advantageously charged with alkali to aid in lowering the heat and to form more cyanid; all as more fully hereinafter set forth and as claimed.

At a sufficiently high temperature, atmospheric nitrogen readily reacts with carbon and alkali to form alkali cyanids and CO. The reaction is really a reversible one, going in one direction (formation of cyanids) at relatively high temperatures and in the other (disappearance of cyanid) at relatively low temperatures. A system comprising an alkaline carbonate, nitrogen and solid carbon at temperatures about, say, 1000° C., always tends to produce alkali cyanid and carbon monoxid with an absorption of heat. At a lower temperature, say, about 800°C., the tendency of a system comprising an alkaline cyanid and carbon monoxid is to revert to alkali (carbonate), nitrogen and solid carbon with development of heat.

In applying these principles to the fixation of nitrogen in the form of cyanid the difficulty arises that at the higher range of temperatures, above 1000° C., where the formation of cyanid is rapid, the cyanid is formed largely as a vapor or fume, both potassium cyanid and sodium cyanid being rather volatile materials at these high temperatures. The cyanids are formed in the presence of carbon monoxid and are distributed through relatively large volumes of gases. In condensing and collecting the volatilized cyanids by simple cooling there are many technical difficulties arising from the damage which the hot gas may cause finely divided cyanid condensing therefrom.

In various proposed processes for synthesizing cyanids in the prior art where liquid or solid cyanid is produced, and where operation is in the intermediate range of, say, 800 to 1000° C., the difficulty is met by cooling the cyanid in the absence of carbon monoxid; that is, in a current of pure nitrogen, so that in cooling down through the dangerous temperature ranges, the cyanid cannot be re-oxidized. This expedient however is impracticable where operation is at any temperature high enough to volatilize cyanid and distribute it through an atmosphere rich in carbon monoxid. In most of these high temperature operations, it may be noted incidentally, there is usually a production of dust of one kind or another; and the dust solids are apt to act catalytically in promoting decomposition of the cyanid with reproduction of alkali.

It is an object of the present invention to provide a means for removing cyanid fumes and vapors from gases in the high temperature range without the necessity of sharply cooling down through the dangerous temperature range. To this end, advantage is taken of the adsorbing power of solid carbon for removing cyanid from high temperature gas mixtures carrying it. As I have found, cyanid can be removed from these high temperature gases by passing them through a layer of carbon and without decomposition of the cyanid; the cyanid being taken up by the carbon by adsorption. Charcoal, probably because of its great surface, is the best adapted form of carbon; but coke and other kinds of carbon may be used. Hot cyanid-carrying gases at 1000 to 1400° C. may be stripped of cyanid by a short charcoal filter. The carbon filter of course operates also to take up and remove any flying dust there may be in such gases. The gases coming beyond the filter are free of dust and cyanid and may be safely used in heat interchangers of ordinary types without fear of clogging or corrosion of the same. After the carbon is charged with cyanid to a sufficient extent, it may be removed from circuit and cooled and the cyanid recovered by leaching or in other ways. As cooling is in the absence, or substantial absence of carbon monoxid, the cyanid does not break up. Or the carbon may be cooled somewhat and then steamed to convert the nitrogen of the cyanid into ammonia. In so doing the carbon is, of course, left charged with alkali. This alkali may then be leached out if desired.

In manufacturing cyanid in the form of vapor or fume in many processes, some of which are hereinafter set forth more in detail, the cyanid carrying gases are delivered at temperatures much in excess of 1000° C., say, at 1400 or 1500° C. Gases of this temperature are hard to handle in apparatus with linings of the usual refractory materials. The temperature is quite high. If the temperature, however, is lowered to about 900 to 1000° C., which may be done without substantial breaking up of cyanid, handling and utilization of the gases becomes much more practicable. In a modification of the present invention, I produce such a lowering of temperature of unduly hot gases of the blast furnace or slagging producer type by a chemical cooling as an incident to the collection of the cyanid vapors or fumes. By charging the carbon used as a filter with a suitable amount of alkali carbonate, the nitrogenous gas mixture going through it at 1400° C. develops a further amount of cyanid at the expense of the alkali and of the carbon; this development of cyanid being attended by an absorption of heat. The gross effect is that the gas carrying cyanid enters the alkalized charcoal at, say, 1400° and emerges with its temperature dropped to, say, 1000°, depositing the cyanid it carries and producing somewhat more cyanid at the expense of the sensible heat which disappears. In other words, I utilize the unwanted sensible heat of the gas for a useful purpose, making cyanid. The cyanid vapors in the gas carry much sensible and latent heat, and this heat is also utilized in making more cyanid.

Gases at a temperature of 900–1000° C. are much more easily handled in the usual recuperative or regenerative heat-utilizing devices than gases at higher temperatures.

In this cooling operation the gas is somewhat enriched as regards combustible value. The alkali in the carbon may be added thereto as a solution of a suitable carbonate, say, sodium carbonate, or it may be alkali which has been deposited in the mass of carbon from previous use and steaming.

The present invention is particularly applicable to processes recovering cyanids from blast furnace gases. Iron furnaces making the usual types of slag must be operated at slag-running temperature, or in excess of, say, 1300° in the crucible or hearth; and at this temperature range the nitrogen of the blast and the carbon of the charge tend to form cyanid if any alkali be present. Alkali can be readily supplied with the charge as soda ash, potassiferous silicates, or recovered alkali (produced by steaming cyanid to make ammonia). With alkali in the charge, the hearth gases are rich in cyanid vapor and fume which may be recovered by withdrawing and cooling such gases. In so withdrawing and cooling the gases it is desirable, for practical reasons, to recover their heat for use with the air blast; but ordinary regenerators and recuperators are difficult to use because of the high temperature, the flying dust and the corrosive action of cyanid and of alkali produced from it. But by the use of a simple carbon filter in line, dust and cyanid can be removed and if the carbon contains a little alkali, the temperature can be readily dropped to the more practicable range (for heat transfer devices) of 900° to 1000°. In so doing the full combustible value of the gas is preserved and indeed somewhat added to.

While I regard the stated invention as particularly applicable for use with hot bosh gases from iron blast furnaces, it may of course be used with any similar very hot gases as for instance with those withdrawn from the hot zones of a slagging gas producer used for producing cyanid vapors, And it may also be employed in connection with various other cyanid producing methods operating at a high temperature and producing hot cyanid-laden gases, as for instance with various reversing or reverberatory furnace processes producing cyanid on a hearth.

I regard my invention however as particularly applicable to blast furnace gases and shall describe it more particularly as applied thereto.

I provide a carbon filter in proximity to the blast furnace and connected therewith by a suitable conduit leading to the hot zone of the furnace at a point somewhat above the tuyeres. Advantageously, a settling chamber is provided ahead of the filter. The carbon filter takes the form of a column of coke or charcoal. Several such filters are provided in practice to permit successive use. The connection between the furnae and filter is by means of a water jacketed pipe which should be of ample cross section and may be made of copper or iron. The carbon filter may be in the form of a vertical tower of masonry or metal with the gas inlet near one end and an outlet at the other. It is advantageous however to have it in the form of a bottom connected double tower, that is of a general U-shape with the inlet for the hot gases at the top of one tower and the outlet for the cooled gases at the top of the other, there being a sump in the bottom connection.

With this carbon filter a number of different operations are made practicable as hereinafter set forth. Which is preferable depends upon market considerations. Its use gives a great deal of flexibility in this relation.

For the present purposes it is desirable to maintain ample amounts of cyanid as fume and vapor in the hot zone of the blast furnace; partly for the sake of normal operation of such furnace and partly to obtain as high a concentration as practical of cyanid in the withdrawn hot gases. To this end, if a sufficient amount of alkali does not exist in the charge of the furnace, more must be added. This added alkali may be in the form of natural alkali-containing silicates, such as feldspar, leucite, greensand, etc., and in particular where the production of potash is desired; or it may be in the form of alkali from other sources, such as commercial soda ash, alkali regained in the present operation, etc. Whatever be the source of the alkali, the amount added in the charge should be at least sufficient to balance the withdrawal as cyanid. As very little alkali goes away with the slag, any excess added, over and above the amount going away as cyanid, reappears as dust and fume of oxidized compounds (mainly carbonate and silicate) in the top gas—the gas withdrawn at the top of the blast furnace by the usual downcomer, etc. It is better so to manage conditions that alkali, in substantial amounts, does not appear in the top gas.

Presuming the supply of alkali to the blast furnace to be ample and that cyanid as such is to be a commercial product, the hot gases from the tuyere zone may be simply passed into a vertical column of coke or charcoal in a suitable shaft chamber of metal or masonry. It may be water cooled near the top. The lower hotter zones of the carbon collect cyanid until the local concentration is greater than that corresponding to the particular temperature, when the excess drains away in a molten state to a suitable sump. In this mode of operation the carbon of the filter does not waste or alter, save that some layers commonly become contaminated or dirtied by flying dust coming with the gas, so that they must be removed from time to time. After removal the carbon may be leached with an appropriate solvent to recover cyanid as such or it may be steamed to convert the cyanid nitrogen into ammonia and leached to recover soluble alkali compounds (carbonate, formate or oxalate). The residue is then added to the blast furnace charge to utilize the contained carbon and the alkali present as insoluble silicates, etc. In the mode of operation just described, the cooling is physical; the intense heat of the furnace gases is simply dissipated by radiation, water cooling, etc. The gas delivered beyond the carbon filter is substantially of the same composition as the bottom blast furnace gas; i. e., it is practically a producer gas somewhat richer in CO than is usual. It may be delivered from the carbon filter rather hot, say, up to 800° or 900° C.; or it may be cooled as low as may be desirable. It is of course free from dust.

The sensible heat of very hot blast furnace gas or slagging producer gas may, as stated, be utilized to produce cyanid by the simple expedient of supplying alkali carbonate or hydrate with the charcoal. Under these conditions part of the sensible heat of the gas is removed by what may be called chemical cooling; that it, it is used up in compensating for the endothermic action incident to converting alkali into alkali cyanid and the gases are thereby cooled to a more convenient temperature. The newly produced cyanid joins whatever may be carried by the furnace gases and is collected with it. Operating in this manner, the carbon wastes away in the production of cyanid and there must be a corresponding amount of carbon added from time to time together with the necessary alkali. The gas produced is richer than that just described to the extent that cyanid is produced. A smaller and more compact filter suffices.

Carbon may be added in the form of gaseous or liquid hydrocarbons and the alkali in the molten state. The gas will then be enriched by hydrogen and the production of cyanid is enhanced by the heat of the molten alkali.

If alkali and ammonia are the products desired, rather than cyanid itself, the cyanid in the filter may be decomposed by steam or water vapor; either continuously or discontinuously. In the latter case, several filter chambers may be employed, so that one may function in collecting cyanid while another is being steamed. Because of the high heat of the filter, instead of using steam, water may be introduced. The action of steam or water vapor upon cyanid depends on the temperature. At low temperatures it forms ammonia and a formate; at higher temperatures carbonate and ammonia and at a temperature around 400° C., oxalate is produced. Oxalic acid is a desirable byproduct; and furthermore, the production of oxalate offers a convenient means of separating potash and soda where both exist, as is commonly the case, in an alkali-rich charge fed to the blast furnace. Orthoclase, or potash feldspar, ordinarily contains considerable amounts of soda replacing potash; and the same is true of most other potassiferous natural silicate materials. Since oxalate of potassium is much more soluble than oxalate of sodium and tends to repress the solubility of the latter, by methodically leaching charcoal which has been used as a filter and then steamed, the two alkalies may be obtained in the form of their oxalates, successively. By treating the oxalate solution with milk of lime, oxalate of calcium is produced from which oxalic acid may be produced in well known ways, while the mother liquor contains the alkali in the caustic form. This caustic alkali (potash or soda) may be recovered by the usual evaporator treatment.

As before, the carbon of the filter may, or may not, contain added alkali for the purpose of producing additional cyanid. Where it does, some portions of the recovered alkali, either the potash or the soda, may be used for this purpose. The ammonia produced in steaming may be recovered in any of the usual ways.

In producing alkali and ammonia in the manner just described, cyanid can be allowed to flow into a sump as before; and this cyanid treated by steaming, leaching, etc. In this event, the carbon of the filter itself may not be steamed or leached, save when it becomes dirty. Unless cyanid is removed in the sump for subsequent treatment, however, the carbon must be leached frequently since otherwise it would accumulate undue amounts of alkali. Steaming, leaching, etc., may be in the filter chamber itself or the carbon may be removed therefrom and steamed elsewhere, as may be most convenient.

Where there is very little alkali normally present in the furnace charge—not enough to balance withdrawals as cyanid, some must of course be added if a continuous production of substantial amounts of cyanid vapors in the furnace is desired. And where it is not desired to use alkali from other sources for the addition, it is convenient to use alkali recovered from the filters. In so operating, a relatively small amount of alkali, either potash or soda, may be kept, so to speak, in circulation; functioning first in the blast furnace to produce cyanid, being recovered in the carbon and then being returned to the furnace. Operating in this manner and using a plurality of successively functioning filters, one filter body may be charged with cyanid from the hot gases, then steamed to produce alkali and ammonia, and the whole steamed body of carbon sent back to the charge of the blast furnace. A charge of carbon may be used in the filter to absorb cyanid, then steamed to produce ammonia and once more exposed to contact with the hot gas to produce more cyanid at the expense of the alkali left after the steaming, and this repeated until the accumulation of alkali necessitates either leaching or returning to the furnace. Often, it is better to use a sort of mixed procedure; the filter charge being made up in part of fresh carbon and in part of carbon which has been steamed and contains alkali.

The particular way in which the fixed nitrogen is recovered from the filter, that is, whether as ammonia or as cyanid, depends, as will be seen, upon the composition of the materials introduced into the blast furnace, the market price of alkali and similar conditions; and the same is true of the question whether alkali, oxalic acid, etc., are to be produced. It very often happens with the normal charge of a blast furnace that there is some alkali present, enough to cause some, but not much, production of cyanid; and in this event it may be desirable to use a mixed procedure—returning to the furnace part of the alkali recovered in making ammonia, leaving the rest of the alkali to be marketed. In so doing, the furnace and filter can be kept under optimum condition and a maximum delivery of fixed nitrogen be obtained with a natural supply of alkali in the charge which is rather small. Whatever this supply, however, as long as it is greater than the amount lost in the slag, the excess can be obtained in commercial form.

The present invention is equally applicable to the treatment of hot gases from a slagging gas producer for the purpose of cooling, enriching and freeing the same of cyanid fumes and vapors. As is well known, except for the iron producing function, a slagging gas producer is much the same thing as a blast furnace, being run at a temperature high enough to produce molten slag and rich gas; gas nearly free of $CO_2$. Gas produced by contacting air with excess of carbon at any temperature above about 1000° C. is practically free of $CO_2$, consisting of CO and $N_2$. In the ordinary type of producers, in order to avoid clinker difficulties with the fuel ash, the temperature is kept down, usually by blowing in steam or products of combustion, while in the slagging producer the temperature is kept high enough to deliver the ash in a molten state; slagging being assisted by the addition of lime with the fuel. With fuel and lime substantially free of alkalies and with no added alkali, the hot gases withdrawn are of course practically free of cyanid vapors; and on passing such gases through alkali-containing charcoal all the cyanid produced is that formed at the expense of the sensible heat of the gases. By supplying alkali with the charge and removing the gas hot, it can be laden with cyanid vapor and fume originating in the producer in the same way as in a blast furnace.

In the accompanying drawing I have shown, more or less diagrammatically, certain apparatus within the present invention and capable of employment in performing the described process. In this showing the figure is in central vertical section, certain parts being broken away and certain parts shown in elevation.

Element 1 indicates, fragmentarily, an iron blast furnace or slagging producer provided with the usual slag and metal outlets 2 and 3, bustle pipe 4 and tuyeres 5. Tapped into the bosh regions of the furnace are a plurality of downwardly inclined hot gas outlets 6. The hot gas outlets may however be annularly continuous. The hot gas passes into a collecting and settling conduit or chamber 7. Communicating with this chamber is conduit 8 provided with water cooled valve 9. There may be several of these conduits each connected to a carbon filter. The carbon filter is here shown as a double tower; that is as a general U or V-shape to provide a down leg 10 and an up leg 11 communicating at 12 which may form a sump or cyanid collecting chamber. One object of using the U or V-shape is to provide air cooling for the wall between the down leg and up leg. Other forms of chambers containing carbon so disposed as to act as a filtering medium may be used; but for a number of reasons I prefer a pair of chambers through which the gas goes successively downward and upward. For one thing, this provides for downward flow of collecting molten cyanid in excess of the amount which the carbon will take up and hold by simple adsorption with convenient recovery of the same. For another, it is convenient in charging and emptying the filter. As shown, the horizontal connection between the up leg and down leg is provided with manhole 13 for emptying the filter and plugged outlet 14 at the lowest point for tapping off molten material. The filter is shown as charged with granular carbon 15 which may be charcoal or coke. Coal carbonized at a low temperature to give an open textured carbon nearly free of volatiles is better than ordinary coke; but the latter may be used. In the up-leg of the filter is shown a cooling coil 16 through which air, water or steam may be passed if desired. Filtered gas leaves the apparatus through 17, going to a suitable point of use (not shown) such as a heat exchanging device or a furnace. Manholes 18 and 19 are provided for charging with carbon. Steam inlet 20 and ammonia discharge 21 are also provided in order to permit convenient steaming. The hot gas outlet (17) is provided with valve 22. Where it is desired to add molten alkali to the filter this may be done through inlet 23. Additional carbon may be added through the manhole already mentioned and carbon for reaction may also be added in the form of hydrocarbon liquids or gases (such as natural gas, oil gas, etc.) through valved inlet 24.

In the use of the described apparatus hot cyanid carrying gases are collected in 7. As shown, these gases come from the hot zones of the blast furnace through inlets 6; but they may well come from any other apparatus delivering hot gas of the same general character laden with cyanid; that is, gas consisting substantially of carbon monoxid and nitrogen with fumes or vapors of cyanid therein and at a very high temperature, say 1300 to 1400° C. These gases with the contained cyanid and, usually, more or less dust, pass through 8 past valve 9 into the upper end A of the filter 10. Here the dust is taken up by the upper layers of carbon and the hot gas carrying cyanid passes through the carbon below. Cyanid is taken up by adsorption. This action does not lower the temperature of the gases but on the contrary raises the heat; adsorption per se being attended with a development of heat. Presuming the filter is charged with carbon not containing alkali, the heat of the gases, including the sensible heat of the gas itself, the sensible heat of the cyanid vapors and the latent heat as well, as well as the heat of adsorption, is dissipated more or less by radiation. As so far described, therefore, the heat of the gas reaching chamber B at the other end of the filter will not be lessened save in so far as this is done by radiation. It may even be enhanced somewhat unless special cooling means are provided. The gas is not substantially enriched. Working in this way operation may be continued until the top layers of carbon in chamber A become clogged and dirty to too great an extent. During this period the upper layers of carbon in A become charged with adsorbed cyanid to the extent permitted by the temperature. Generally more cyanid is taken up than the carbon in the upper layers can permanently hold and this flows downward and accumulates in the horizontal leg whence it may be tapped off from time to time through 14. As the whole apparatus is at a temperature in excess of the melting point of cyanids (800 to 850° C.) any excess accumulating in either 10 or 11, beyond that which the carbon can hold, drains through to 14. After a time it is generally best to remove the carbon from the filter at 13 and leach it or steam it to utilize the contained cyanid. If it be leached, the carbon may then be returned to the filter. If it be steamed it is then left charged with oxalate, formate or carbonate according to circumstances and must be appropriately treated. If these salines be removed by leaching, the carbon may then, as before, go back. Or the saline charged carbon may be returned to the blast furnace as part of the charge; or any part of it may be so returned.

As so far described, the apparatus is operated merely as a filter: the carbon layers next A are acting as a dust filter and the other layers as an adsorbing filter. There is no loss in heat save by sheer physical cooling.

In more advantageous embodiments of my invention I produce a chemical cooling in the filter, thereby utilizing the excess sensible heat of the gas, say between 1300 to 1400° C. and 900 to 1000° C., as well as the sensible and latent heat of such cyanid vapors as are present for producing more cyanid. To this end the charcoal of the filter is charged with alkali. It may also contain, although not necessarily, a catalytic metal such as iron.

For example, charcoal, if used, may be charged with a small amount of an iron solution and then with sodium carbonate. Or the sodium carbonate alone may be used. As the hot gases enter the carbon, the alkali is reduced with production of cyanid and with the production of carbon monoxid which joins and enriches the gases. The alkali in the carbon may be simply that which has resulted from a previous use and steaming. Or I may charge the carbon with soda or other alkali during the operation. In so doing it is advantageous to charge the alkali in the molten form, thereby supplying more heat to be used in the production of cyanid. In so doing gated alkali inlet 23 may be employed. Soda ash may for example be melted in any suitable furnace and supplied through 23. In this production of cyanid at the expense of the heat there is, of course, a disappearance of carbon from the filter. More may be added through 18 or carbon may be supplied in the form of hydrocarbons through 24. Where hydrocarbon is used hydrogen is split off and goes forward to join and enrich the gas.

In one way of using the carbon filter it may be alternately employed for cyanid collection and production and steaming. In this event, after hot cyanid carrying gases have been passed through for a time, valves 9 and 22 are closed and the apparatus is allowed to cool somewhat. At this time steam is passed in through 20 and the excess of steam goes forward with the ammonia to be removed at 21. This leaves the carbon somewhat diminished in amount and charged with alkali. Steam may now be cut off and the introduction of hot cyanid carrying gases resumed and so on repeatedly. After a time the carbon in the filter generally becomes too dirty and the contents of the filter may then be returned to the blast furnace.

Very many ways of utilizing the filter may be employed; and the selection of the particular way of using it depends largely upon temporary commercial conditions.

The cyanid tapped off at 14 may be steamed or collected for utilization in other ways.

While other materials of basic nature, such as lime, magnesia, etc., may be employed as a filtering and adsorbing medium in lieu of carbon, I regard the use of charcoal or coke as best adapted for my purposes. A carbonized coal produced at low temperature is better than hard metallurgical coke as presenting a greater surface of action to the gases.

What I claim is:

1. In nitrogen fixation, the process which comprises removing hot cyanid laden gases from a blast furnace and passing the same through a filter of adsorptive carbon.

2. In nitrogen fixation, the process which comprises removing hot cyanid laden gases from a blast furnace and passing the same through a filter of adsorptive carbon, said carbon containing alkali.

3. In nitrogen fixation, the process which comprises exposing a body of adsorptive carbon to contact with hot cyanid laden blast furnace gases, subsequently steaming said carbon to form and carry forward ammonia gas and leaching the residual carbon to extract alkali.

4. In nitrogen fixation, the process which comprises exposing a body of adsorptive carbon to contact with hot cyanid laden blast furnace gases, subsequently steaming said carbon at a temperature around 400° C. to form ammonia and leaching the residual carbon in a plurality of successive extractions.

5. In nitrogen fixation, the process which comprises treating hot carbon and alkali with hot cyanid vapor in the presence of hot nitrogen containing gases.

6. In nitrogen fixation, the process which comprises treating carbon and alkali at a temperature above 800° C., with cyanid vapor in the presence of nitrogen-containing gases.

7. In nitrogen fixation, the process which comprises contacting hot nitrogen-carrying gases carrying cyanid vapor with material containing carbon and alkali and releasing said gases from said contact at a temperature below the condensing point of cyanid whereby the cyanid is condensed and the heat developed in condensation is utilized in the formation of more cyanid.

8. In the utilization of hot vapor-laden and dust-laden gases from blast furnaces the process which comprises passing such gases in contact with adsorptive carbon for a sufficient length of time to remove vapor and dust therefrom and releasing the residual gases while still at a substantially, high temperature.

9. In the utilization of hot vapor-laden and dust-laden gases from blast furnaces and of a temperature of 1000° C., or more, the process which comprises passing such gases in contact with adsorptive carbon and releasing them from contact therewith at a temperature not below 800° C.

10. In the utilization of hot vapor-laden and dust-laden gases from blast furnaces and of a temperature of 1000° C., or more, the process which comprises passing such gases in contact with adsorptive carbon in the presence of materials capable of undergoing endothermic reaction and releasing them from contact therewith at a temperature not below 800° C.

11. In the utilization of hot vapor-laden and dust-laden gases from blast furnaces and of a temperature of 1000° C., or more, the process which comprises passing such gases in contact with adsorptive carbon in the presence of alkali and releasing them from contact therewith at a temperature not below 800° C.

12. In nitrogen fixation, the process which comprises removing hot cyanid-laden gases from a blast furnace and contacting the same with carbon and alkali in the presence of a cyaniding catalyst.

13. In nitrogen fixation, the process which comprises contacting hot nitrogen-carrying cyanid-laden gases with material containing carbon and alkali in the presence of a cyaniding catalyst.

14. In nitrogen fixation, the process which comprises contacting carbon with molten alkali and with hot nitrogen-carrying, cyanid-laden gases.

15. In nitrogen fixation, the process which comprises contacting a catalytic mass with molten alkali, hydrocarbon gases and hot nitrogen-carrying, cyanid-laden gases.

16. In nitrogen fixation, the process which comprises contacting alkali-containing material with hydrocarbon gases and with hot nitrogen-carrying cyanid-laden gases.

17. In nitrogen fixation, the process which comprises contacting hot gas of the character of that withdrawn from the hot zones of a blast furnace, said gas being at a temperature above 1000° C., with alkalized carbon and withdrawing said gas from contact with said carbon while still hot but after a substantial lowering of temperature is effected in said gas.

18. In nitrogen fixation the process which comprises contacting a gas of the character of that withdrawn from the hot zones of a blast furnace, said gas being at a temperature above 1000° C., with alkalized carbon and withdrawing the gases from such contact while still hot but at a temperature not higher than 1000° C.

In testimony whereof, I affix my signature.

K. P. McELROY.